United States Patent
Jin et al.

(10) Patent No.: US 8,107,046 B2
(45) Date of Patent: *Jan. 31, 2012

(54) LIQUID CRYSTAL DISPLAY DEVICE AND METHOD OF DRIVING THE SAME

(75) Inventors: Hyun-Suk Jin, Gyeonggi-do (KR);
Joon-Kyu Park, Gyeonggi-do (KR);
Hyung-Seok Jang, Gyeonggi-do (KR);
Deuk-Su Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1433 days.

This patent is subject to a terminal disclaimer.

(21) Appl. No.: 11/646,494

(22) Filed: Dec. 28, 2006

(65) Prior Publication Data

US 2007/0153205 A1  Jul. 5, 2007

(30) Foreign Application Priority Data

Dec. 29, 2005 (KR) .......................... 10-2005-0132796

(51) Int. Cl.
*G02F 1/1343* (2006.01)

(52) U.S. Cl. ....................................... 349/141; 349/139

(58) Field of Classification Search .................. 349/139, 349/141–143
See application file for complete search history.

(56) References Cited

U.S. PATENT DOCUMENTS

| 7,599,035 B2 * | 10/2009 | Park et al. ................. | 349/141 |
| 7,692,750 B2 * | 4/2010 | Jang et al. ................. | 349/141 |
| 7,728,941 B2 * | 6/2010 | Jin et al. .................... | 349/141 |

FOREIGN PATENT DOCUMENTS

| JP | 9-325346 A | 12/1997 |
| JP | 11-295717 A | 10/1999 |

OTHER PUBLICATIONS

Office Action issued Jan. 6, 2010 in corresponding Japanese Application No. 2006-338027.

* cited by examiner

*Primary Examiner* — Dung T. Nguyen

(74) *Attorney, Agent, or Firm* — Morgan, Lewis & Bockius LLP

(57) ABSTRACT

A liquid crystal display device includes first and second substrates facing and spaced apart from each other; a gate line on an inner surface of the first substrate; a data line crossing the gate line to define a plurality of first sub-pixel regions for displaying color, and a second sub-pixel region for adjusting a viewing angle; a thin film transistor connected to the data line and the gate line; a plurality of first pixel electrodes in each of the plurality of first sub-pixel regions; a plurality of first common electrodes alternating with the plurality of first pixel electrodes in each of the plurality of first sub-pixel regions; a second pixel electrode in the second sub-pixel region; a second common electrode in the second sub-pixel region, the second common electrode facing the second pixel electrode; and a liquid crystal layer between the first and second substrates, wherein a first common voltage is applied to the plurality of first common electrodes, and a second common voltage different from the first common voltage is applied to the second common electrode.

34 Claims, 8 Drawing Sheets

LIQUID CRYSTAL DISPLAY DEVICE AND METHOD OF DRIVING THE SAME

This application claims the benefit of Korean Patent Application No. 10-2005-0132796, filed on Dec. 29, 2005, which is hereby incorporated by reference in its entirety.

BACKGROUND OF THE INVENTION

1. Field of the Invention

Embodiments of the present invention relates to a liquid crystal display (LCD) device, and more particularly, to an LCD device having an adjustable viewing angle and a method of driving the LCD device. Embodiments of the present invention are suitable for a wide scope of applications. In particular, an embodiment of the present invention is suitable for providing an adjustable viewing angle for a sub-pixel region of an LCD.

2. Discussion of the Related Art

In general, a liquid crystal display (LCD) device relies on an optical anisotropy and a polarizability of liquid crystal molecules to produce an image. The optical anisotropy of liquid crystal molecules causes a refraction of light incident onto the liquid crystal molecules in accordance with an alignment direction of the liquid crystal molecules. Liquid crystal molecules are aligned in specific directions due to their long, thin shape. The alignment direction of the liquid crystal molecules can be controlled by applying an electric field thereto. Among LCD devices, active matrix liquid crystal display (AMLCD) devices have thin film transistors (TFTs) and pixel electrodes connected to the TFTs in a matrix arrangement. AMLCD devices have been widely used because of their high resolution and superiority in displaying moving images.

A twisted nematic (TN) mode LCD device includes a first substrate having a pixel electrode, a second substrate having a color filter layer and a common electrode, and a liquid crystal layer interposed between the first and second substrates. Liquid crystal molecules in the liquid crystal layer are driven by a vertical electric field generated between the pixel electrode and the common electrode. Accordingly, the TN mode LCD device has high transmittance and wide aperture ratio. However, the TN mode LCD device has a relatively narrow viewing angle. An in-plane switching (IPS) mode LCD device has been suggested to overcome the problem of the narrow viewing angle suffered by the TN mode LCD device.

FIG. 1 is a cross-sectional view of an IPS mode LCD device according to the related art. As shown in FIG. 1, an IPS mode LCD device includes a first substrate 110, a second substrate 120 and a liquid crystal layer 130 between the first and second substrates 110 and 120. A pixel electrode 112 and a common electrode 114 are formed on the first substrates 110. A voltage difference is applied between the pixel electrode 112 and the common electrode 114 to align the liquid crystal molecules in the liquid crystal layer 130. The aligned liquid crystal molecules are arranged along a horizontal electric field 100 generated between the pixel electrode 112 and the common electrode 114. The viewing angle increases because the variation in refractive index with respect to the viewing angle is relatively small.

FIG. 2 is a schematic plane view of an array substrate for an IPS mode LCD device according to the related art. Referring to FIG. 2, a gate line GL and a data line DL are formed on a substrate. The gate line GL crosses the data line DL to define a sub-pixel region "SP." A common line "Vcom" is formed to be parallel to and spaced apart from the gate line "GL." A switching element, such as a thin film transistor (TFT) "T," is connected to the gate line GL and the data line "DL." A plurality of common electrodes 252 and a plurality of pixel electrodes 212 are formed in the sub-pixel region "SP." The plurality of common electrodes 252 extend from the common line "Vcom" and are parallel to the data line "DL." The plurality of pixel electrodes 212 extend from an extension line 220 connected to the TFT "T" and alternate with the plurality of common electrodes 252. Gap portions 290 between the pixel electrodes 212 and the common electrode 252 correspond to a substantial aperture region where liquid crystal molecules are driven by a horizontal electric field.

As shown in FIG. 2, the pixel electrode 212 and the common electrode 252 of the related art IPS mode LCD device have a straight bar shape. Such a shape of the pixel electrode 212 and the common electrode 252 produces a mono-domain structure causing shortcomings of the IPS mode LCD device, such as a gray level inversion. An IPS mode LCD device having zigzag-shaped electrodes has been suggested to surmount the shortcomings.

FIG. 3 is a schematic plane view of an array substrate having a zigzag shaped electrode for an IPS mode LCD device according to the related art. Referring to FIG. 3, a pixel electrode 212 and a common electrode 252 have a zigzag shape having at least one bent portion. Not shown in FIG. 3, the data line DL may have a zigzag shape corresponding to the pixel electrode 212 and the common electrode 252. When a voltage is applied to the pixel electrode 212 and the common electrode 252, liquid crystal molecules are re-aligned along at least two directions due to the zigzag shape of the pixel electrode 212 and the common electrode 252. Accordingly, the IPS mode LCD device may have a multi-domain structure. In the multi-domain structure, a color shift phenomenon is reduced and gray level inversion is improved. As a result, the IPS mode LCD device has a relatively wide viewing angle allowing many users to concurrently view the displayed images.

However, some applications require a narrow viewing angle for the displayed images to be viewable by a limited number of users, for example, a single user. For example, an LCD device may be used as a display in an internet banking environment and in an automatic teller machine. In such circumstances, it is desirable that the displayed images could only viewed by a customer standing within a restricted viewing angle of the display and not by people standing or passing by to protect the customer for eventual prying eyes. A side viewing angle of the LCD device can be adjusted using a filter. However, using a filter for adjusting the side viewing angle complicates the fabrication process for the LCD device, and increases power consumption and fabrication cost.

SUMMARY OF THE INVENTION

Accordingly, embodiments of the present invention are directed to a liquid crystal display device and a method of driving the same that substantially obviate one or more of the problems due to limitations and disadvantages of the related art.

An object of an embodiment of the present invention is to provide an adjustable viewing angle for a liquid crystal display device without using a filter.

Another object of an embodiment of the present invention is to provide a method of driving a liquid crystal display device having an adjustable viewing angle without using a filter.

Another object of an embodiment of the present invention is to reduce a flicker in a liquid crystal display device.

Another object of an embodiment of the present invention is to provide a method of driving a liquid crystal device to reduce a flicker in the liquid crystal display device.

Additional features and advantages of the invention will be set forth in the description of exemplary embodiments which follows, and in part will be apparent from the description of the exemplary embodiments, or may be learned by practice of the exemplary embodiments of the invention. These and other advantages of the invention will be realized and attained by the structure particularly pointed out in the written description of the exemplary embodiments and claims hereof as well as the appended drawings.

To achieve these and other advantages and in accordance with the purpose of the present invention, as embodied and broadly described in the following exemplary embodiments, a liquid crystal display device includes first and second substrates facing and spaced apart from each other; a gate line on an inner surface of the first substrate; a data line crossing the gate line to define a plurality of first sub-pixel regions for displaying color, and a second sub-pixel region for adjusting a viewing angle; a thin film transistor connected to the data line and the gate line; a plurality of first pixel electrodes in each of the plurality of first sub-pixel regions; a plurality of first common electrodes alternating with the plurality of first pixel electrodes in each of the plurality of first sub-pixel regions; a second pixel electrode in the second sub-pixel region; a second common electrode in the second sub-pixel region, the second common electrode facing the second pixel electrode; and a liquid crystal layer between the first and second substrates, wherein a first common voltage is applied to the plurality of first common electrodes, and a second common voltage different from the first common voltage is applied to the second common electrode.

In another aspect, a liquid crystal display device includes first and second substrates facing each other; a liquid crystal layer between the first and second substrates; at least one first pixel electrode in a first sub-pixel region of an inner surface of the first substrate; at least one first common electrode on the inner surface of the first substrate, the at least one first common electrode alternating with the at least one first pixel electrode for generating a substantially horizontal electric field between the at least one first pixel electrode and the at least one first common electrode in the first sub-pixel region; a second pixel electrode in a second sub-pixel region of inner surface of the first substrate, the second sub-pixel region adjacent to the first sub-pixel region; and a second common electrode on an inner surface of the second substrate, the second common electrode facing the second pixel electrode for generating a substantially vertical electric field between the second pixel electrode and the second common electrode in the second sub-pixel region.

In another aspect, a method of driving a liquid crystal display device is provided; the liquid crystal device includes first and second substrates facing each other with a liquid crystal layer between the first and second substrates, at least one first pixel electrode in a first sub-pixel region of an inner surface of the first substrate, at least one first common electrode on the inner surface of the first substrate, the at least one first common electrode alternating with the at least one first pixel electrode, a second pixel electrode in a second sub-pixel region of inner surface of the first substrate, the second sub-pixel region adjacent to the first sub-pixel region, and a second common electrode on an inner surface of the second substrate, the second common electrode facing the second pixel electrode; the method includes applying a first common voltage to the at least one first common electrode to generate a substantially horizontal electric field between the at least one first pixel electrode and the at least one first common electrode in the first sub-pixel region; and applying a second common voltage to the second common electrode to generate a substantially vertical electric field between the second pixel electrode and the second common electrode in the second sub-pixel region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of embodiments of the present invention and are incorporated in and constitute a part of this application, illustrate embodiments of the present invention and together with the description serve to explain the principle of embodiments of the present invention. In the drawings.

DETAILED DESCRIPTION OF EXEMPLARY EMBODIMENTS

Reference will now be made in detail to exemplary embodiments of the present invention, which are illustrated in the accompanying drawings. Wherever possible, the same reference numbers will be used throughout the drawings to refer to the same or similar parts.

Figure 1:
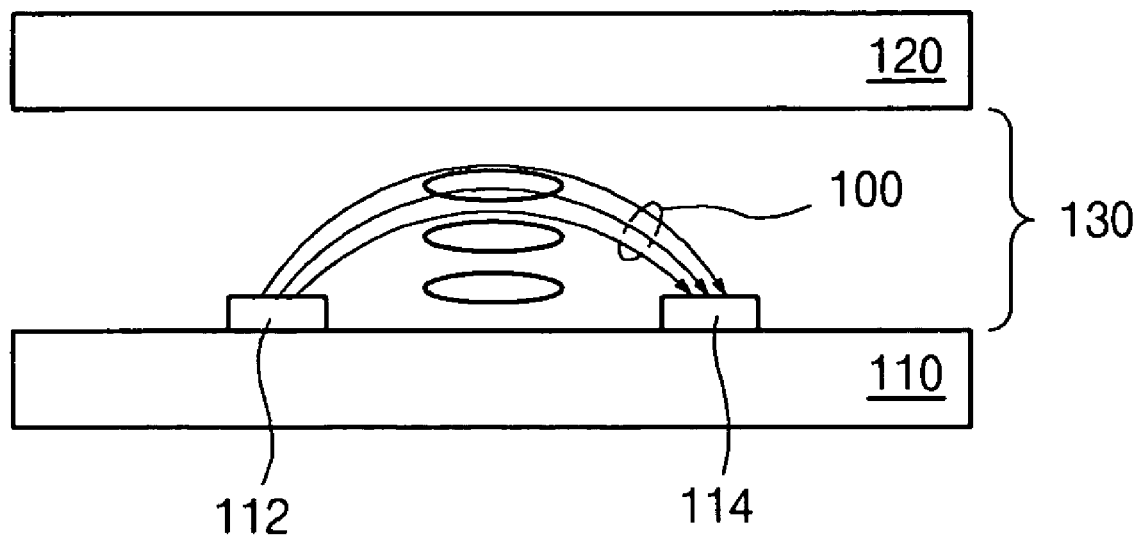
FIG. 1 is a cross-sectional view of an IPS mode LCD device according to the related art.
Figure 2:
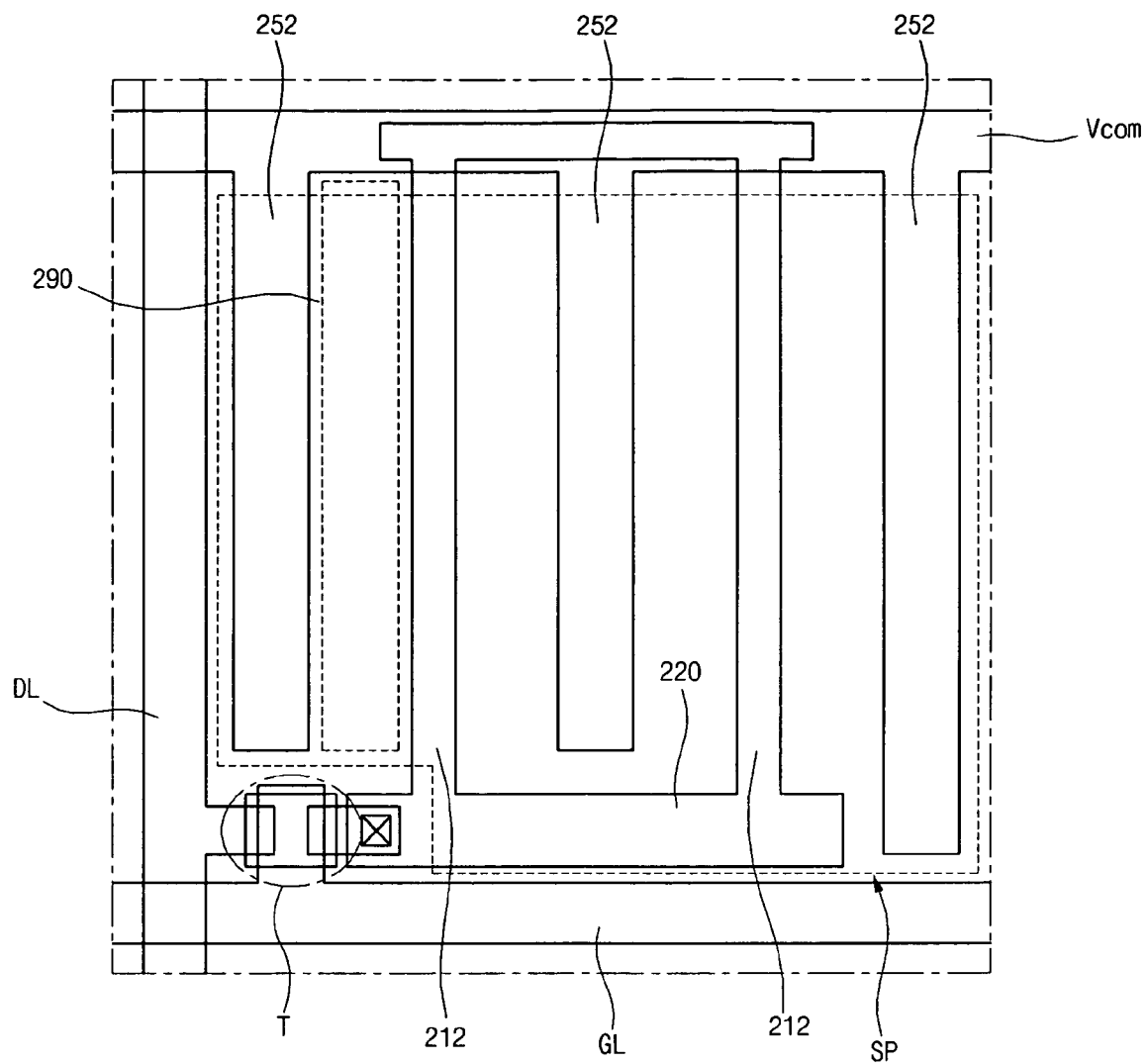
FIG. 2 is a schematic plane view of an array substrate for an IPS mode LCD device according to the related art.
Figure 3:
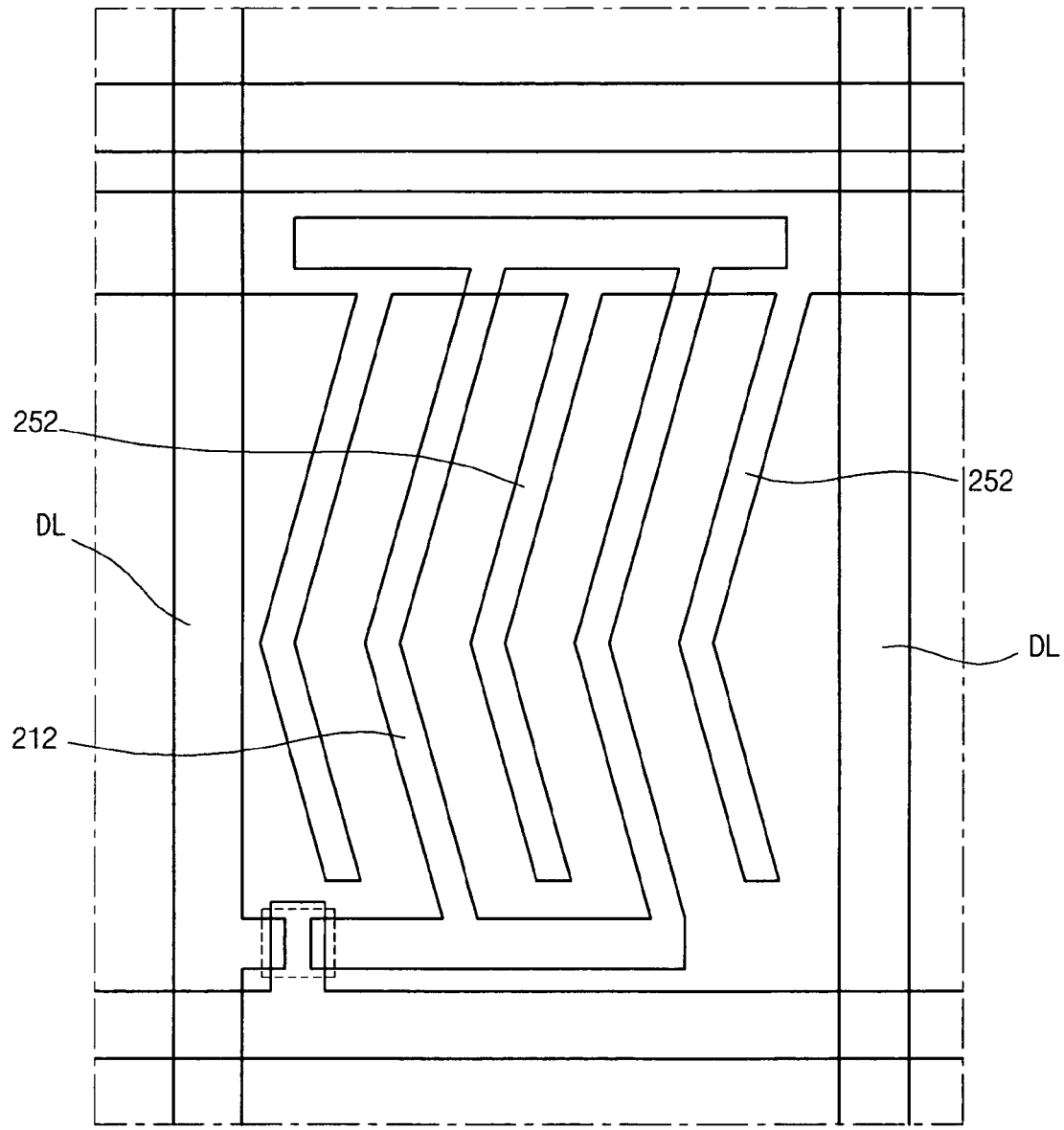
FIG. 3 is a schematic plane view of an array substrate having a zigzag shaped electrode for an IPS mode LCD device according to the related art.
Figure 4A:
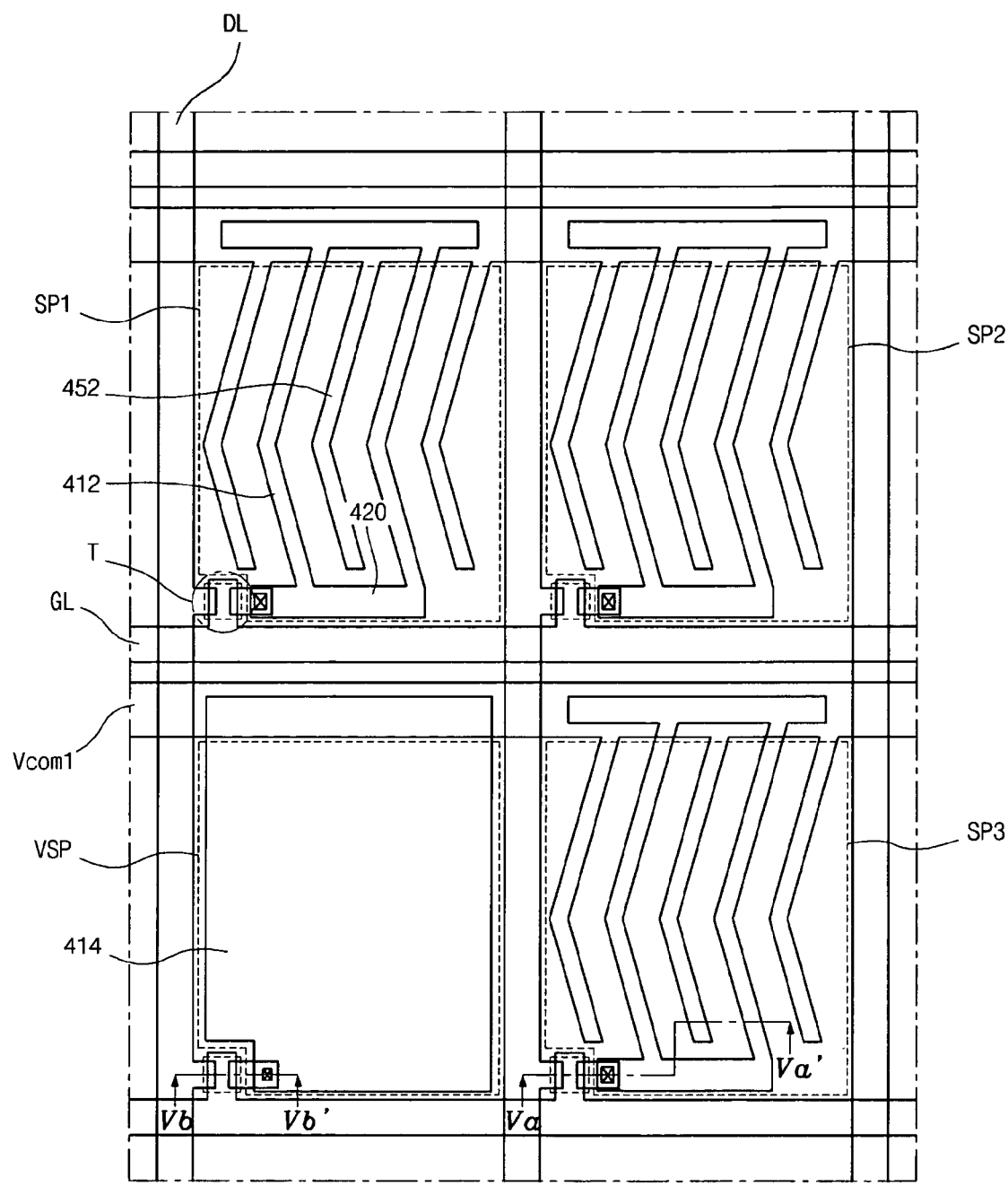
FIG. 4A shows a schematic plane view of exemplary sub-pixel regions in a first substrate of an LCD device according to an embodiment of the present invention.
Figure 4B:
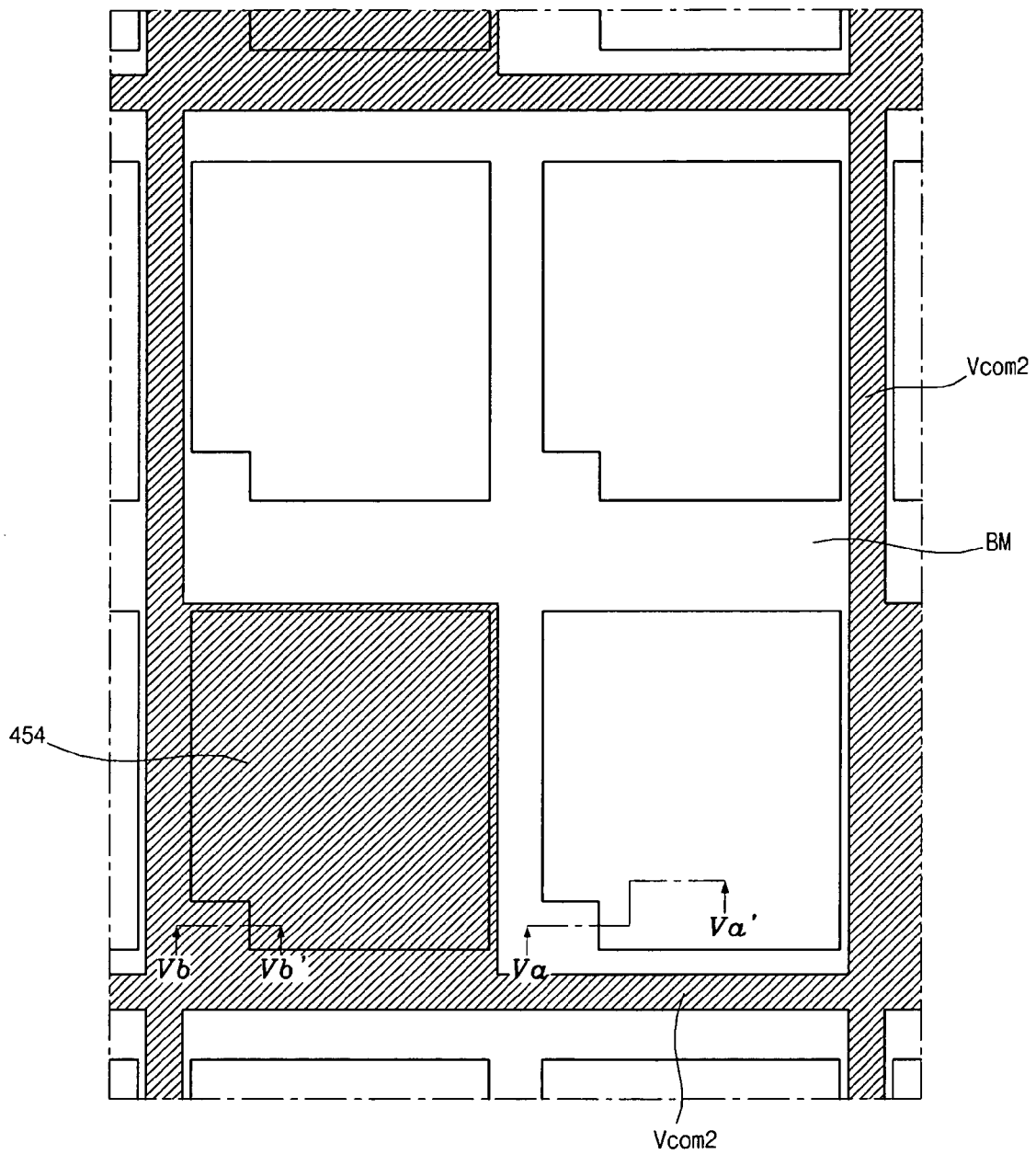
FIG. 4B shows a schematic plane view of exemplary sub-pixel regions in a second substrate of an LCD device according to an embodiment of the present invention.
Figure 5A:
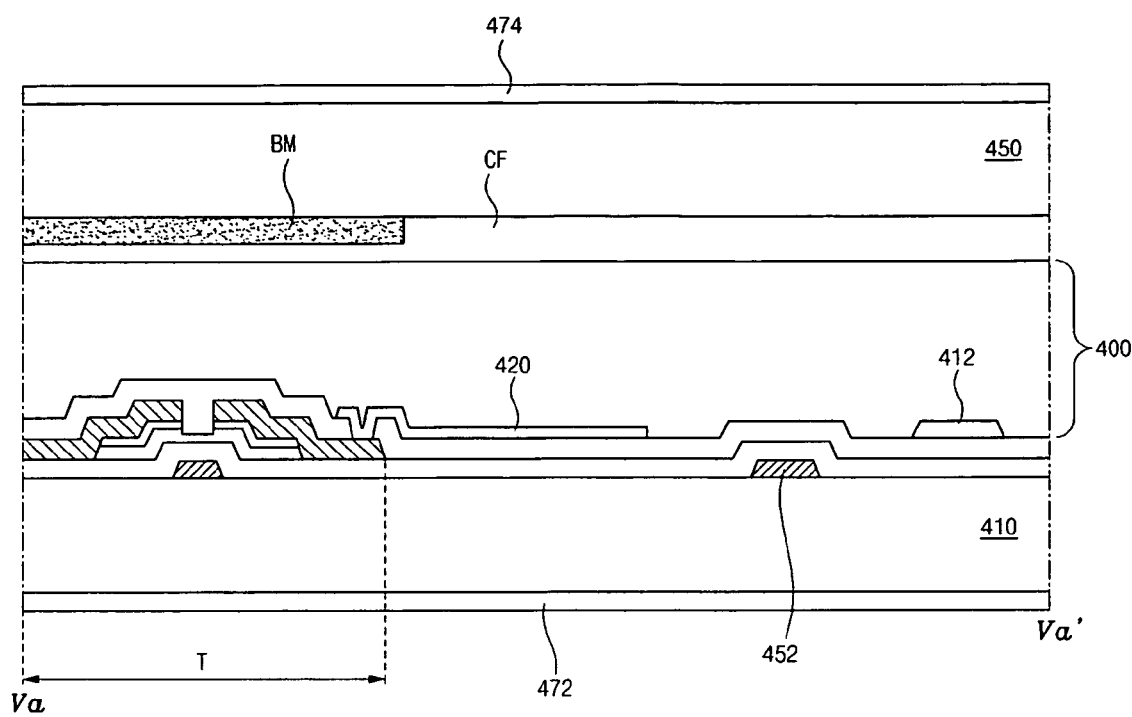
FIG. 5A is a schematic cross-sectional view along a line Va-Va' of FIGS. 4A and 4B of an exemplary sub-pixel region of an LCD device according to an embodiment of the present invention.
Figure 5B:
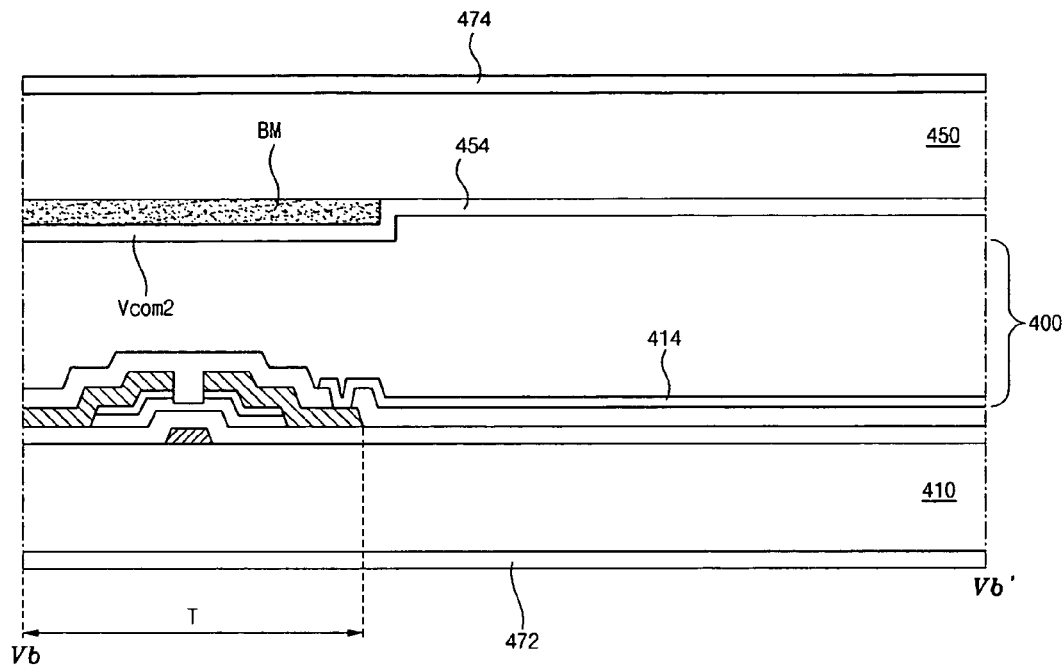
FIG. 5B is a schematic cross-sectional view along a line Vb-Vb' of FIGS. 4A and 4B of an exemplary sub-pixel region for adjusting a viewing angle of an LCD device according to an embodiment of the present invention.

FIG. 4A shows a schematic plane view of exemplary sub-pixel regions in a first substrate of an LCD device according to an embodiment of the present invention. FIG. 4B shows a schematic plane view of exemplary sub-pixel regions in a second substrate of an LCD device according to an embodiment of the present invention. FIG. 5A is a schematic cross-sectional view along a line Va-Va' of FIGS. 4A and 4B of an exemplary sub-pixel region of an LCD device according to an embodiment of the present invention. FIG. 5B is a schematic cross-sectional view along a line Vb-Vb' of FIGS. 4A and 4B of an exemplary sub-pixel region for adjusting a viewing angle of an LCD device according to an embodiment of the present invention.

Referring to FIGS. 4A and 4B, and 5A and 5B, an LCD device includes a first substrate 410, a second substrate 450. The first and second substrates 410 and 450 (shown in FIGS. 5A and 5B) face and are spaced apart from each other. A liquid crystal layer 400 (shown in FIGS. 5A and 5B) is formed between the first and second substrates 410 and 450. A plurality of gate lines GL (shown in FIG. 4A) and a plurality of data lines DL (shown in FIG. 4A) are formed on an inner surface of the first substrate 410.

The plurality of gate lines GL cross the plurality of data lines DL to define a plurality of sub-pixel regions in a matrix arrangement. The sub-pixel regions are grouped into pixel regions for displaying images. A pixel region of the LCD device may include four or more adjacent sub-pixel regions. For example, a pixel region may include a first color sub-pixel region SP1, a second color sub-pixel region SP2, a third color sub-pixel region SP3, and a viewing angle adjusting sub-pixel region VSP forming a two-by-two matrix.

A switching device, such as a thin film transistor (TFT) "T," is formed in each sub-pixel region. The TFT "T" is connected to one of the gate lines GL and one of the data lines DL. A black matrix BM is formed on an inner surface of the second substrate 450 to correspond to the gate lines GL, the data lines DL and the TFT "T."

In the first to third color sub-pixel regions SP1 to SP3, an extension line 420, a plurality of first pixel electrodes 412 and a plurality of first common electrodes 452 are formed on an inner surface of the first substrate 410. The extension line 420 is connected to the TFT "T." Each of the plurality of first pixel electrodes 412 is connected to the extension line 420. The TFT "T" is turned on by a gate signal through the corresponding gate line GL. A data signal from the corresponding data line DL is transmitted to the plurality of first pixel electrodes 412 through the TFT "T."

A plurality of first common lines Vcom1 are formed parallel to and spaced apart from the plurality of gate lines GL. The first common electrodes 452 are connected to the first common lines Vcom1. The plurality of first pixel electrodes 412 alternate with the plurality of first common electrodes 452.

A color filter layer CF is formed on the black matrix BM and the inner surface of the second substrate 450. A plurality of second common lines Vcom2 is formed on the black matrix BM. The plurality of second common lines Vcom2 may correspond to the gate lines GL and the data lines DL. In addition, the plurality of second common lines Vcom2 may be parallel to or perpendicular to the plurality of first common lines Vcom1 on the first substrate 410. Gap portions between the first pixel electrode 412 and the first common electrode 452 correspond to a substantial aperture region where the liquid crystal layer 400 is driven by a horizontal electric field.

In an embodiment of the present invention, each of first pixel electrodes 412 and the first common electrodes 452 has a zigzag shape. In another embodiment, the first pixel electrode 412 and the first common electrode 452 may have a straight bar shape. Moreover, in yet another embodiment of the present invention, the data line DL may have a zigzag shape corresponding to the first pixel electrode 412 and the first common electrode 452.

A second pixel electrode 414 is formed on the inner surface of the first substrate 410 in the sub-pixel region VSP for adjusting the viewing angle of the LCD device. The second pixel electrode 414 may have a plate shape. The second pixel electrode 414 is connected to the TFT "T" corresponding to the sub-pixel region VSP. The TFT "T" is turned on by a gate signal through the corresponding gate line GL. A data signal is transmitted from the corresponding data line DL to the second pixel electrode 414 through the TFT "T."

A second common electrode 454 is formed on the inner surface of the second substrate 450. The second common electrode 454 is connected to the plurality of second common lines Vcom2. The second common electrode 454 may have a plate shape. The second common lines Vcom2 connect to adjacent second common electrodes 454. The color filter layer CF is not formed in the viewing angle adjusting sub-pixel region VSP.

As shown in FIGS. 5A and 5B, the LCD device may further include first and second polarizing plates 472 and 474 formed on outer surfaces of the first and second substrates 410 and 450, respectively. Transmission axes of the first and second polarizing plates 472 and 474 may cross each other. For example, the transmission axes of the first and second polarizing plates 472 and 474 may be about 0° and about 90°, respectively, with respect to a direction parallel to the gate line GL. Further, the liquid crystal layer may be aligned such that initial alignment directions at bottom and top portions of the liquid crystal layer 400 are opposite to each other. For example, the initial alignment directions at the top and bottom portions of the liquid crystal layer 400 may be about 90° and about 270°, respectively, with respect to a direction parallel to the gate line GL.

An exemplary operation of the LCD device can be described as follows. The TFT "T" in each of the first to third color sub-pixel regions SP1, SP2 and SP3 is turned on by the gate signal through the gate line GL, and the data signal through the data line DL is transmitted to the plurality of first pixel electrodes 412 in each of the first to third color sub-pixel regions SP1, SP2 and SP3. Since a first common voltage is applied to the plurality of first common electrodes 452 on the first substrate 410, a horizontal electric field is generated between the first pixel electrode 412 and the first common electrode 452. Accordingly, liquid crystal molecules in the first to third color sub-pixel regions SP1 to SP3 are re-aligned by the horizontal electric field and a transmittance of the liquid crystal layer 400 is adjusted, thereby displaying images.

The TFT "T" in the viewing angle adjusting sub-pixel region VSP is turned on by the gate signal through the gate line GL, and the data signal through the data line DL is transmitted to the second pixel electrode 414. Since a second common voltage different from the first common voltage is applied to the second common electrode 454 on the second substrate 450, a vertical electric field is generated between the second pixel electrode 414 and the second common electrode 454. Accordingly, the liquid crystal molecules in the sub-pixel region VSP are re-aligned by the vertical electric field. Here, since the sub-pixel region VSP has one of an ON state and an OFF state, the liquid crystal layer 400 in the sub-pixel region VSP transmits or blocks light from a backlight unit (not shown) depending on the state of the sub-pixel region VSP. When the sub-pixel region VSP is in the OFF state, the viewing angle of the LCD device is not restricted and the LCD device displays images having a first, wide viewing angle. When the sub-pixel region VSP is in the ON state, the viewing angle of the LCD device is restricted and the LCD device displays images having a second viewing angle narrower than the first viewing angle.

Thus, the viewing angle of the LCD device changes with the state of the sub-pixel region VSP. The viewing angle of the LCD device can be made narrow by turning ON the sub-pixel region VSP. The viewing angle of the LCD device can be made wider by turning OFF the sub-pixel region VSP.

Figure 6:
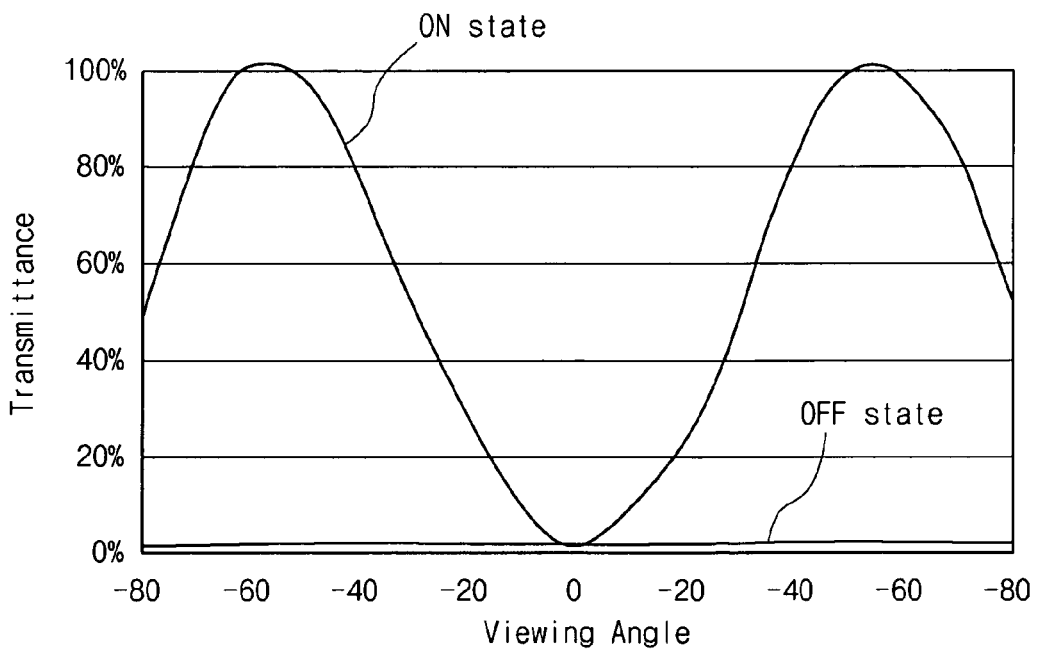
FIG. 6 is a graph illustrating operation of an exemplary sub-pixel region for adjusting a viewing angle of an LCD device according to an embodiment of the present invention.

FIG. 6 is a graph illustrating operation of an exemplary sub-pixel region for adjusting a viewing angle of an LCD device according to an embodiment of the present invention. As shown in FIG. 6, when the viewing angle adjusting sub-pixel region VSP is in the OFF state, the transmittance of the liquid crystal layer 400 in the sub-pixel region VSP is very low, for example close to or about 0% along all viewing angles. When the viewing angle adjusting sub-pixel region VSP is in the ON state, the transmittance of the liquid crystal layer 400 in the sub-pixel region VSP is close to or about 0% along a front direction of the LCD device and increases with the viewing angle increases obliquely with respect to the front direction. The front direction can be, for example, a normal direction to the first and second substrates 410 and 450.

Accordingly, when the viewing angle adjusting sub-pixel region VSP is in the OFF state, it does not contribute to displaying images and the LCD device displays images visible to several users using the first to third color sub-pixel regions SP1, SP2 and SP3. In addition, when the sub-pixel region VSP is in the ON state, it displays a white image in the oblique direction with respect to the front direction. Since the white image prevent the first to third color sub-pixel regions SP1, SP2 and SP3 from displaying images along the oblique direction, the viewing angle of the LCD device along the oblique direction is restricted and the LCD device displays images for a user positioned in front of the LCD device.

In the LCD device, a first pixel voltage Vp1 of the first pixel electrode 412 may be reduced due to a parasitic capacitance between a gate electrode and a drain electrode of the corresponding TFT "T" and a capacitance between the first pixel electrode 412 and the first common electrode 452 when the TFT "T" is turned off. The variation $\Delta Vp1$ in the first pixel voltage is referred to as a kickback voltage and may cause deterioration such as flicker. Similarly, a second pixel voltage Vp2 of the second pixel electrode 414 may be reduced due to a parasitic capacitance between a gate electrode and a drain electrode of the corresponding TFT "T" and a capacitance between the second pixel electrode 414 and the second common electrode 454 when the TFT "T" is turned off. The variation $\Delta Vp2$ in the second pixel voltage may also cause deterioration such as flicker.

In the LCD device, each of the first to third color sub-pixel regions SP1, SP2 and SP3 may have a different electrode structure from the sub-pixel region VSP. Accordingly, the first pixel voltage variation $\Delta Vp1$ in each of the first to third color sub-pixel regions SP1, SP2 and SP3 can be different from the second pixel voltage variation $\Delta Vp2$ in the sub-pixel region VSP. In an embodiment of the present invention, different common voltages can be applied to each of the first to third color sub-pixel regions SP1, SP2 and SP3 and to the viewing angle adjusting sub-pixel region VSP to reduce the flicker in each of the sub-pixel regions SP1, SP2, SP3, and VSP.

Figure 7:
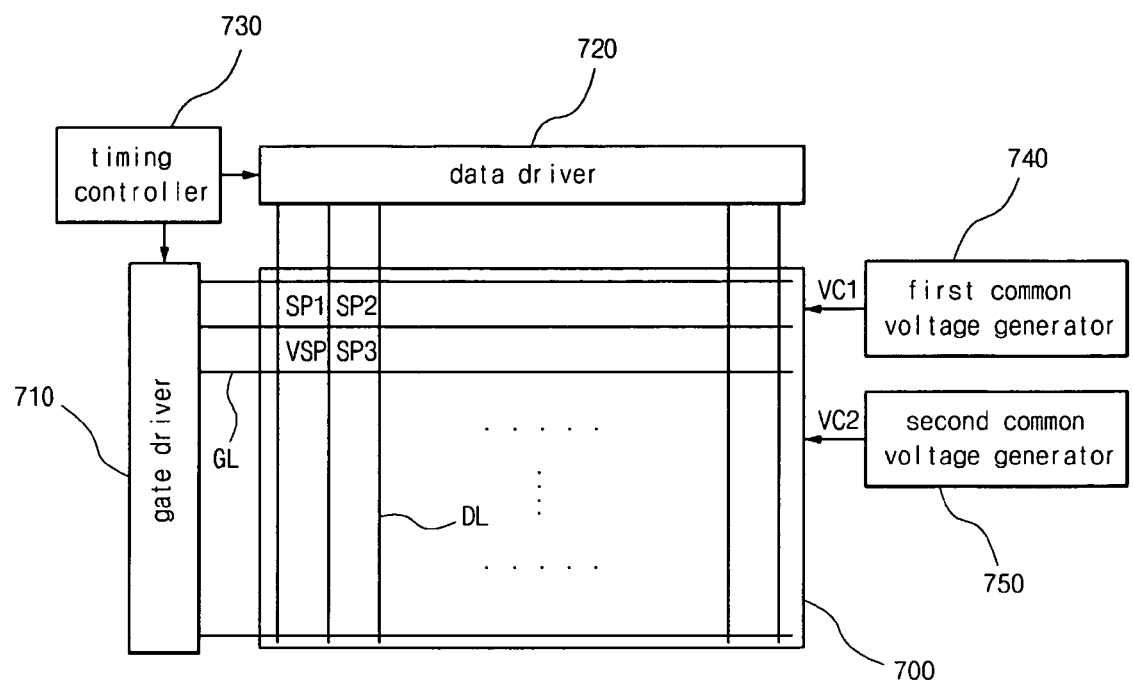
FIG. 7 is a schematic block diagram of an LCD device according to an embodiment of the present invention.

FIG. 7 is a schematic block diagram of an LCD device according to an embodiment of the present invention. Referring to FIG. 7, the LCD device includes a liquid crystal panel 700, a gate driver 710, a data driver 720, a timing controller 730, a first common voltage generator 740 and a second common voltage generator 750. The liquid crystal panel 700 includes first to third color sub-pixel regions SP1, SP2 and SP3, where a liquid crystal layer 400 (shown in FIG. 5A) is driven by a horizontal electric field, and a viewing angle adjusting sub-pixel region VSP, where the liquid crystal layer 400 (shown in FIG. 5B) is driven by a vertical electric field. The first common line Vcom1 (shown in FIG. 4A) is connected to the first common voltage generator 740, and the second common line Vcom2 is connected to the second common voltage generator 750 through a connection means (not shown) between the first and second substrates 410 and 450 and a pad (not shown) over the first substrate 410.

The gate driver 710 sequentially supplies a gate signal to a plurality of gate lines GL in the liquid crystal panel 700. The data driver 720 supplies a data signal corresponding to a one row of horizontal sub-pixel regions to a plurality of data lines DL in synchronization with the gate signal. The timing controller 730 receives several externally provided sync signals and image data and outputs a plurality of control signals and image signals to the gate driver 710 and the data driver 720.

The first and second common voltage generators 740 and 750 generate first and second common voltages VC1 and VC2, respectively. The first common voltage VC1 can be different from the second common voltage VC2. The first and second common voltages VC1 and VC2 are supplied to the first and second common lines Vcom1 and Vcom2 (shown in FIGS. 4A and 4B), respectively. Accordingly, the first pixel voltage variations $\Delta Vp1$ and the second pixel voltage variation $\Delta Vp2$ are individually compensated to minimize flicker. For example, when the first pixel voltage variation $\Delta Vp1$ in each of the first to third color sub-pixel regions SP1, SP2 and SP3 is greater than the second pixel voltage variation $\Delta Vp2$ in the viewing angle adjusting sub-pixel region VSP, the first common voltage VC1 may be selected to be lower than the second common voltage VC2. Accordingly, the flicker in each of the first to third color sub-pixel regions SP1, SP2 and SP3 and the flicker in the viewing angle adjusting sub-pixel region VSP is reduced. Further, the first and second common voltages VC1 and VC2 can be set in accordance with the first pixel voltage variations $\Delta Vp1$ in each of the first to third color sub-pixel regions SP1, SP2 and SP3 and the second pixel variation $\Delta Vp2$ in the viewing angle adjusting sub-pixel region VSP. Thus, the first and second common voltages VC1 and VC2 can be set in accordance with the parasitic capacitance between the gate electrode and the drain electrode of the TFT "T" and the storage capacitance and the liquid crystal capacitance between the pixel electrode and the common electrode in each sub-pixel region.

In addition, although not shown in FIG. 7, each of the first and second common voltage generators 740 and 750 may further include a voltage distributing unit and an inversion amplifying unit. The voltage distributing unit distributes a source voltage to units of the LCD device and the inversion amplifying unit inverts and amplifies the distributed source voltage. The voltage distributing unit may include a plurality of resistors connected to each other in series. In addition, the inversion amplifying unit may include an OP-AMP.

Consequently, in the LCD device according to an embodiment of the present invention, the viewing angle is adjusted using a sub-pixel region that displays a white image along an oblique direction with respect to a front direction of the LCD device. In addition, the flickers due to the pixel voltage variation in the color sub-pixel region driven by an horizontal electric field and in the viewing angle adjusting region driven by a vertical electric field are individually reduced by applying different common voltages to the color sub-pixel region and the viewing angle adjusting region, respectively. Accordingly, the LCD device displays images of high display quality with a switchable viewing angle.

It will be apparent to those skilled in the art that various modifications and variations can be made in the liquid crystal display device and method of driving the same of embodiments of the present invention. Thus, it is intended that embodiments of the present invention cover the modifications and variations of the embodiments described herein provided they come within the scope of the appended claims and their equivalents.

What is claimed is:

1. A liquid crystal display device, comprising:
first and second substrates facing and spaced apart from each other;
a gate line on an inner surface of the first substrate;
a data line crossing the gate line to define a plurality of first sub-pixel regions for displaying color, and a second sub-pixel region for adjusting a viewing angle;
a thin film transistor connected to the data line and the gate line;
a plurality of first pixel electrodes in each of the plurality of first sub-pixel regions;
a plurality of first common electrodes alternating with the plurality of first pixel electrodes in each of the plurality of first sub-pixel regions;
a second pixel electrode in the second sub-pixel region;
a second common electrode in the second sub-pixel region, the second common electrode facing the second pixel electrode; and
a liquid crystal layer between the first and second substrates,
wherein a first common voltage is applied to the plurality of first common electrodes, and a second common voltage different from the first common voltage is applied to the second common electrode.

2. The liquid crystal display device of claim 1, wherein the plurality of first pixel electrodes, the plurality of first common electrodes and the second pixel electrode are formed on an inner the first substrate, and wherein the second common electrode is formed on an inner surface of the second substrate.

3. The liquid crystal display device of claim 1, further comprising a black matrix on the inner surface of the second substrate and a color filter layer in the first sub-pixel regions on the inner surface of the second substrate, the black matrix corresponding to the gate line, the data line and the thin film transistor.

4. The liquid crystal display device of claim 1, further comprising first and second common voltage generators generating the first and second common voltages, respectively.

5. The liquid crystal display device of claim 1, wherein the second common voltage is greater than the first common voltage.

6. The liquid crystal display device of claim 1, wherein each of the plurality of first pixel electrodes and the plurality of first common electrodes have a zigzag shape.

7. The liquid crystal display device of claim 1, wherein each of the plurality of first pixel electrodes and the plurality of first common electrodes have a bar shape.

8. The liquid crystal display device of claim 1, wherein the liquid crystal layer has top and bottom portions having initial alignment directions of about 90° and about 270°, respectively, with respect to a direction parallel to the gate line.

9. The liquid crystal display device of claim 1, further comprising first and second polarizing plates on outer surfaces of the first and second substrates, respectively.

10. The liquid crystal display device of claim 9, wherein the first and second polarizing plates have transmission axes of about 0° and about 90°, respectively, with respect to a direction parallel to the gate line.

11. The liquid crystal display device of claim 1, wherein the liquid crystal layer in the first sub-pixel regions is aligned by a horizontal electric field and the liquid crystal layer in the second sub-pixel region is aligned by a vertical electric field.

12. A liquid crystal display device, comprising:
first and second substrates facing each other;
a liquid crystal layer between the first and second substrates;
at least one first pixel electrode in a first sub-pixel region of an inner surface of the first substrate;
at least one first common electrode on the inner surface of the first substrate, the at least one first common electrode alternating with the at least one first pixel electrode for generating a substantially horizontal electric field between the at least one first pixel electrode and the at least one first common electrode in the first sub-pixel region;
a second pixel electrode in a second sub-pixel region of inner surface of the first substrate, the second sub-pixel region adjacent to the first sub-pixel region; and
a second common electrode on an inner surface of the second substrate, the second common electrode facing the second pixel electrode for generating a substantially vertical electric field between the second pixel electrode and the second common electrode in the second sub-pixel regions,
wherein a first common voltage is applied to the at least one first common electrode, and a second common voltage different from the first common voltage is applied to the second common electrode.

13. The liquid crystal device of claim 12, wherein the first common voltage lower than the second common voltage when a voltage variation of the first sub-pixel region is greater than a voltage variation of the second sub-pixel region.

14. The liquid crystal device of claim 12, further comprising a switching device for turning on the second sub-pixel region to increase a transmittance of the liquid crystal layer in accordance with a viewing angle in an oblique direction.

15. The liquid crystal device of claim 12, further comprising a switching device for turning off the second sub-pixel region to produce a substantially low transmittance of the liquid crystal layer in accordance with a wide viewing angle.

16. The liquid crystal device of claim 12, further comprising a switching device for turning on the second sub-pixel region to transmit a white light through the liquid crystal layer in an oblique direction.

17. The liquid crystal device of claim 12, further comprising means including a switching device in the second sub-pixel region for preventing the first sub-pixel region from displaying an image in an oblique direction.

18. The liquid crystal device of claim 12, further comprising:
a backlight unit; and
means including a switching device in the second sub-pixel region for transmitting a light from the backlight unit.

19. The liquid crystal device of claim 12, further comprising:
a backlight unit; and
means including a switching device in the second sub-pixel region for blocking a light from the backlight unit.

20. The liquid crystal device of claim 12, further comprising a black matrix on an inner surface of the second substrate.

21. The liquid crystal device of 20, further comprising a color filter layer on the inner surface of the second substrate including the black matrix.

22. The liquid crystal device of claim 12, wherein the at least one first pixel electrode has a bar shape.

23. The liquid crystal device of claim 12, wherein the at least one first pixel electrode has a zigzag shape.

24. The liquid crystal device of claim 12, wherein the second pixel electrode has a plate shape.

25. The liquid crystal device of claim 12, further comprising:
   a gate line on an inner surface of the first substrate;
   a data line crossing the gate line to form the first and second sub-pixel regions; and
   a switching device connected to the gate line and the data line in each of the first and second sub-pixel regions for turning on one or more of first and second sub-pixel regions.

26. The liquid crystal device of claim 12, wherein the first common voltage depends on at least one of a parasitic capacitance, a storage capacitance and a liquid crystal capacitance in each of the first sub-pixel region.

27. The liquid crystal device of claim 12, wherein the second common voltage depends on at least one of a parasitic capacitance, a storage capacitance and a liquid crystal capacitance in the second sub-pixel region.

28. A method of driving a liquid crystal display device including first and second substrates facing each other with a liquid crystal layer between the first and second substrates, at least one first pixel electrode in a first sub-pixel region of an inner surface of the first substrate, at least one first common electrode on the inner surface of the first substrate, the at least one first common electrode alternating with the at least one first pixel electrode, a second pixel electrode in a second sub-pixel region of inner surface of the first substrate, the second sub-pixel region adjacent to the first sub-pixel region, and a second common electrode on an inner surface of the second substrate, the second common electrode facing the second pixel electrode, the method comprising:
   applying a first common voltage to the at least one first common electrode to generate a substantially horizontal electric field between the at least one first pixel electrode and the at least one first common electrode in the first sub-pixel region; and
   applying a second common voltage to the second common electrode to generate a substantially vertical electric field between the second pixel electrode and the second common electrode in the second sub-pixel regions,
   wherein the first common voltage is different from the second common voltage.

29. The method of claim 28, wherein the first common voltage depends on at least one of a parasitic capacitance, a storage capacitance and a liquid crystal capacitance in each of the first sub-pixel region.

30. The method of claim 28, wherein the second common voltage depends on at least one of a parasitic capacitance, a storage capacitance and a liquid crystal capacitance in the second sub-pixel region.

31. The method of claim 28, further comprising turning on the second sub-pixel region to increase a transmittance of the liquid crystal layer in accordance with a viewing angle in an oblique direction.

32. The method of claim 28, further comprising turning off the second sub-pixel region to produce a substantially low transmittance of the liquid crystal layer in accordance with a wide viewing angle.

33. The method of claim 28, further comprising turning on the second sub-pixel region to transmit a white light through the liquid crystal layer in an oblique direction.

34. The method of claim 28, further comprising preventing the first sub-pixel region from displaying an image in an oblique direction.

* * * * *